US009036310B2

(12) United States Patent
Prescott (10) Patent No.: US 9,036,310 B2
(45) Date of Patent: May 19, 2015

(54) FEEDBACK PROTECTION FROM ADJACENT TERMINAL SHORTS

(71) Applicant: Power Integrations, Inc., San Jose, CA (US)

(72) Inventor: Daniel C. Prescott, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 97 days.

(21) Appl. No.: 14/012,897

(22) Filed: Aug. 28, 2013

(65) Prior Publication Data

US 2015/0062768 A1 Mar. 5, 2015

(51) Int. Cl.
*H02H 3/24* (2006.01)
*H02H 9/04* (2006.01)

(52) U.S. Cl.
CPC .................... *H02H 9/045* (2013.01)

(58) Field of Classification Search
USPC ....................................... 361/18, 92
See application file for complete search history.

(56) References Cited

U.S. PATENT DOCUMENTS 6,226,190 B1 * 5/2001 Balakrishnan et al. .... 363/21.13
2012/0320640 A1 * 12/2012 Baurle et al. ............... 363/21.17

* cited by examiner

*Primary Examiner* — Danny Nguyen
(74) *Attorney, Agent, or Firm* — Morrison & Foerster LLP (57) ABSTRACT

This relates to detecting unwanted couplings between a protected terminal and an adjacent terminal of an IC controller of a power supply. The voltages across adjacent terminals are monitored. If the voltage difference between the terminals falls below a minimum threshold for greater than a first duration of time, an internal current source injects current into one of the terminals. If, within a second duration of time, the injected current pulls the voltage of the injected terminal to a voltage that causes the voltage difference between the terminals to be above the minimum threshold, it may be determined that a transient fault has occurred and been cleared or falsely detected. If, however, the injected current does not pull the voltage of the injected terminal to a voltage that causes the voltage between the adjacent terminals to be above the minimum threshold, the fault condition is confirmed and switching is disabled.

20 Claims, 6 Drawing Sheets

FEEDBACK PROTECTION FROM ADJACENT TERMINAL SHORTS

BACKGROUND

1. Field

The present disclosure relates generally to power supplies and, more specifically, to controllers for switched-mode power supplies.

2. Related Art

Many electronic devices include a power supply to provide the device with a regulated direct current (dc) power source. One type of power supply that may be used to provide the regulated dc source is a switched-mode power supply, which is popular due to its small size, good output regulation, high efficiency, and safety features. Switched-mode power supplies may be used to convert an alternating current (ac) source or a high-voltage dc source into a regulated dc source having a desired voltage. Based on the specific application, different types of switched-mode power supplies with different control methods and different features may be used.

Typically, a switched-mode power supply includes a switching element coupled to an energy transfer element. Common examples of energy transfer elements include a transformer or coupled inductor, where electrical energy received by an input winding on the input side is stored as magnetic energy that may be converted back to electrical energy at the output side.

Switched-mode power supplies typically include a controller for directing the switching element to be switched between an ON state and an OFF state to control the amount of power transferred through the energy transfer element to achieve output regulation and maintain properties of the output between predefined threshold values. For instance, the controller may be implemented in an integrated circuit (IC) having multiple input and output terminals and configured to receive signals representative of the parameters of the switched-mode power supply, process the sensed signals, and generate control signals to control the switching element to regulate the output of the power supply. For example, the controller may receive a feedback signal representative of the output of the power supply. Based on this signal, the controller may adjust the switching characteristics of the switching element to vary the amount of power transferred to the output of the power supply.

Since the operation of the controller is based at least in part on the feedback signal, it is important that the feedback signal accurately reflects the output voltage. Errors in the feedback signal caused, for example, by a short, or unwanted coupling, between the feedback terminal of the controller and an adjacent terminal may result in improper output regulation, thereby causing the power supply to generate an incorrect or dangerously high output voltage.

Thus, circuitry for detecting unwanted couplings between terminals of a controller is desired.

BRIEF DESCRIPTION OF THE FIGURES

Non-limiting and non-exhaustive embodiments of the present invention are described with reference to the following figures, wherein like reference numbers refer to like parts throughout the various views unless otherwise specified.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure, or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality. In addition, it should be appreciated that the figures provided herewith are for explanation purposes to persons ordinarily skilled in the art and that the drawings are not necessarily drawn to scale.

To provide a thorough understanding of the present invention, in some embodiments, numerous specific details are set forth and, in some cases, simplified equivalent implementation circuits have been described. However, it will be apparent to one having ordinary skill in the art that the equivalent simplified circuits may differ from the actual implementations and that all specific details need not be employed to practice the various embodiments.

Additionally, it should be appreciated that in the description below and in all described examples, a switched-mode power supply may include a controller incorporated into an IC having some or none of the switching and power components in a monolithic or hybrid structure.

Various embodiments are described below for detecting unwanted couplings between a protected terminal and another terminal (e.g., a terminal adjacent to the protected terminal) of an IC controller of a power supply. In one example, the voltage across the adjacent terminals may be monitored during normal operation. In the event that the absolute voltage difference between the adjacent terminals falls below a minimum difference threshold ($\Delta V_{Th}$) for a prescribed period of time (indicating that an unwanted short between the terminals may have occurred), an internal current source may inject a small amount of current into one of the terminals. The current may be injected into the terminal for a threshold duration of time and the voltage across the adjacent terminals may continue to be monitored. If, within the threshold duration of time, the injected current pulls the voltage of the injected terminal to a voltage that causes the voltage difference between the adjacent terminals to be above the minimum difference threshold ($\Delta V_{Th}$), it may be determined that no permanent short between the terminals exists or, in the case of a transient fault occurrence, it has been cleared. If, however, the injected current does not pull the voltage of the injected terminal to a voltage that causes the voltage difference between the adjacent terminals to be above the minimum difference threshold ($\Delta V_{Th}$) within the threshold duration of time, the fault condition is confirmed and switching is terminated and disabled.

In ac input line operation, the existing ripple on the protected terminal (e.g., FB terminal) may ensure that the voltage difference between adjacent terminals may not remain within the minimum difference threshold voltage, $\Delta V_{Th}$ for an extended period of time. However, in operation with a dc input line voltage with a constant load, the protected terminal (e.g., FB terminal) may not see the ripple and it is possible that the two adjacent terminals (e.g., FB and C terminals) may be equal in voltage for an extended period of time. Thus, the verification stage of injecting a small amount of current into the protected terminal (e.g., FB terminal) for a threshold duration of time is performed upon detecting a potential short between adjacent terminals based on a substantially equal voltage (e.g., within the minimum difference threshold, $\Delta V_{Th}$) being present between the two adjacent terminals (e.g., FB and C terminals). The small amount of injected current may pull up the voltage at the FB terminal to determine if the voltage difference between adjacent terminals remains within the minimum difference threshold, $\Delta V_{Th}$. If the terminals are truly shorted, both terminals will rise in voltage, keeping the difference between the two terminals less than $\Delta V_{Th}$. If the two terminals are not shorted, then the difference between the two terminals will exceed $\Delta V_{Th}$, thereby disabling the injecting current source. If the two terminals remain substantially equal in voltage for this period, a FB-to-C terminal short may be confirmed and the device may shut down (stop switching).

Figure 1:
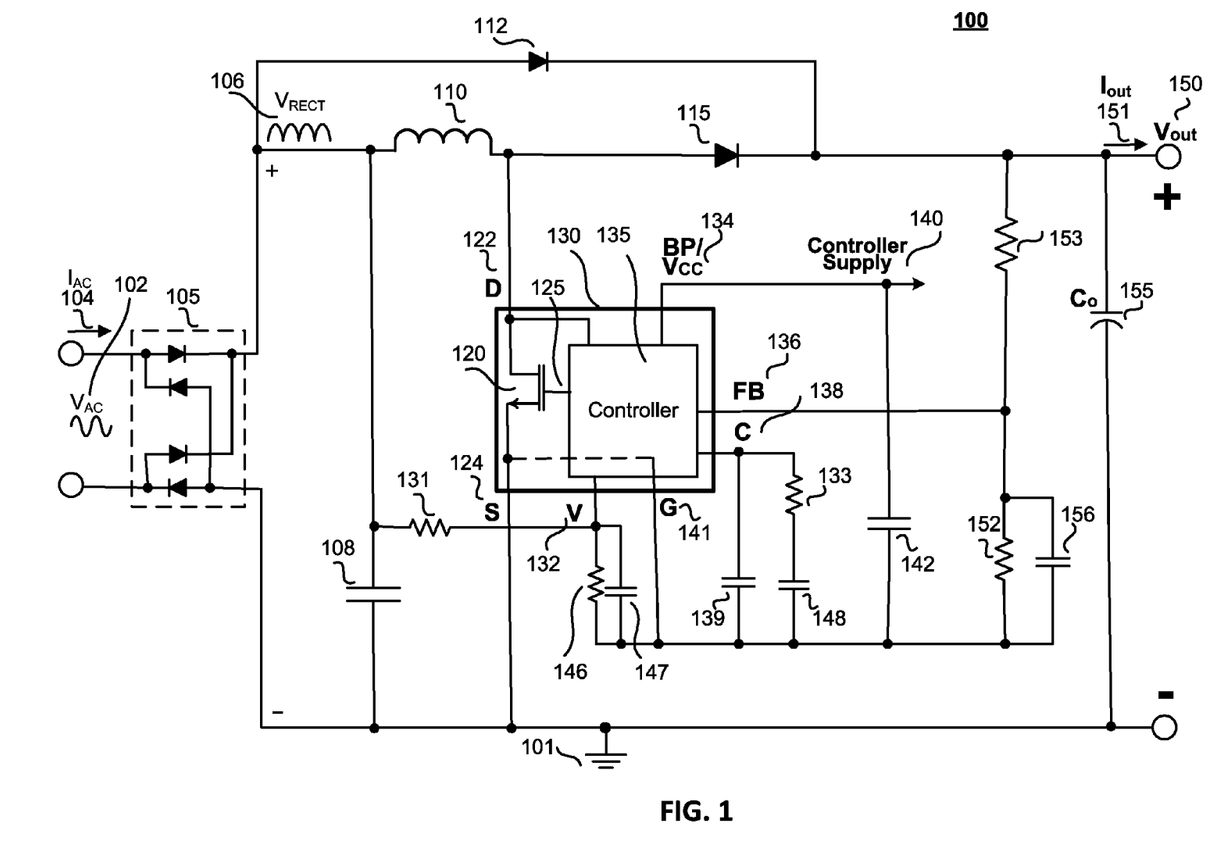
FIG. 1 illustrates a circuit diagram of an exemplary boost converter having a controller that includes adjacent terminal fault detection circuitry.

FIG. 1 illustrates a simplified circuit diagram of an exemplary switched-mode power supply 100 that may be controlled using a controller 135 having adjacent terminal fault detection circuitry for detecting an undesirable electrical coupling between two terminals of the controller, such as an electrical short between the feedback terminal FB 136 and an adjacent terminal of the controller (e.g., a compensation terminal C 138). Power converter 100, also referred to herein as a "power supply," is provided as a general example of a converter that may be controlled using controller 135 that, in some examples, may be included within an IC. In other examples, controller 135 and switch 120, which may include a transistor, such as a metal-oxide-semiconductor field-effect transistor (MOSFET), may be included within a single IC switching block 130.

In the illustrated example of FIG. 1, converter 100 is an off-line power factor correction (PFC) Boost switching power converter that may provide a dc output voltage $V_{out}$ 150 from a wide range (e.g., universal) ac input voltage $V_{AC}$ 102 (also referred to herein as an "input voltage") and input current $I_{AC}$ 104, such as that provided by a conventional wall outlet. The input current $I_{AC}$ 104 may be controlled to have low harmonic distortion and to be in phase with the input voltage $V_{AC}$ 102 in order to present a high power factor (PF) at the input line. In some examples, power supply 100 includes a bridge rectifier 105 for rectifying the ac input voltage $V_{AC}$ 102 to generate a rectified dc voltage $V_{RECT}$ 106. Bridge rectifier 105 may include four diodes arranged as shown in FIG. 1.

Converter 100 may further include input capacitor 108 coupled across bridge rectifier 105 to bypass and filter the high-frequency current from switching device 120. In applications that do not implement PFC, the capacitance of input capacitor 108 may be large enough to cause a dc voltage to be applied to inductor 110. However, for applications implementing PFC, input capacitor 108 may have a smaller capacitance that allows the voltage applied to inductor 110 to substantially follow the sinusoidal shape of rectified voltage $V_{RECT}$ 106. It should be appreciated that, in some examples, converter 100 may further include an EMI filter or other input circuitry that has been excluded from FIG. 1 to avoid unnecessary complexity.

Converter 100 may further include a boost stage made up of boost inductor 110, switching block 130 (having switching device 120 and controller 135 that, in one example, includes an adjacent terminal fault detection circuit), and output rectifier 115. As shown in FIG. 1, output rectifier 115 is coupled to inductor 110 and is exemplified as a single diode (boost diode). However, in other examples, output rectifier 115 may include a transistor used as a synchronous rectifier. To protect output rectifier 115 from inrush current during startup charging of the bulk capacitor $C_o$, 155, converter 100 may further include a second rectifier 112 coupled between bridge rectifier 105 and output bulk capacitor $C_o$, 155 to bypass inductor 110 and rectifier 115.

Based on the signals received at the controller terminals, controller 135 of block 130 may be configured to regulate an output quantity (output voltage $V_{out}$ 150, output current $I_{out}$ 151, or a combination of the two) by generating a switching signal 125 that causes switching device 120 to switch between an ON state and an OFF state to control transfer of power to the output of converter 100 and to provide PFC in response to an input line sense signal and a current sense signal. Specifically, when switching element 120 is in the ON state (closed), energy is stored in the magnetic field of the boost inductor 110, and when switching element 120 is in the OFF state (open), the energy stored in the magnetic field of the boost inductor 110 is transferred through the output rectifier 115 to the load across the output bulk capacitor $C_o$, 155. In some examples, controller 135 and switching device 120 may be implemented and manufactured as a monolithic or hybrid IC, may be implemented with discrete electrical components, or may be implemented with a combination of discrete and integrated components. Additionally, it should be appreciated that, in some examples, output rectifier 115 may also be implemented as a monolithic or hybrid IC along with controller 135 and switching device 120.

Controller 135 may include terminal G 141 (representing reference ground of the controller), terminal D 122 (representing the drain of the MOSFET used as switching device 120), and terminal S 124 (representing the source of the MOSFET used as switching device 120). For the non-isolated boost converter 100 of FIG. 1, the input of converter 100, output of converter 100, and controller 135 may share a common reference ground 101. In these examples, terminal G 141 may be coupled to controller terminal S 124, which may be coupled to reference ground 101.

Controller 135 may further include bypass terminal BP/Vcc 134 for receiving a dc power supply to power the controller. As shown in FIG. 1, bypass terminal BP/Vcc 134 receives power from controller supply 140 across capacitor 142. In some examples, controller supply 140 may be taken from a bias (auxiliary) winding coupled on the same core of the boost inductor 110 (the energy transfer element) to provide the internal supply after startup of the converter. In other examples, controller supply 140 may be taken from the input dc bus of converter 100 or from a separate dc supply.

Controller 135 may further include terminal V 132 for receiving an input line sense signal representative of the rectified dc voltage $V_{RECT}$ 106, which is representative of input voltage $V_{AC}$ 102. As shown, terminal V 132 is coupled to receive the input line sense signal across capacitor 147 and through divider resistors 131 and 146. The input line sense signal may also be used to detect the input line peak value and zero-crossing to provide a reference for the PFC control of the input line current.

Controller 135 may further include feedback terminal FB 136 for receiving a feedback signal representative of the output of converter 100. In some examples, the feedback signal may be received by feedback terminal FB 136 through the resistive divider formed by resistors 153 and 152 across capacitor 156. In some examples, the feedback signal may represent output voltage $V_{out}$ 150 as either a current signal or a voltage signal.

Figure 3A:
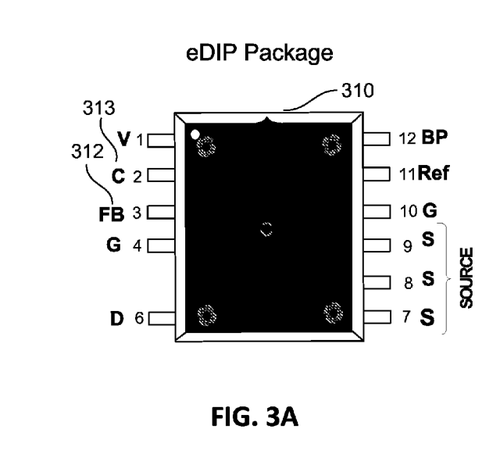
FIG. 3A illustrates an exemplary packaging and pin-out of an IC controller having adjacent FB and C terminals.
Figure 3B:
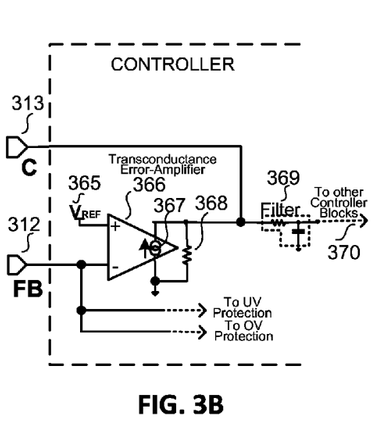
FIG. 3B illustrates an exemplary pin-out structure with internal blocks coupled to the adjacent FB and C terminals of the controller of FIG. 3A.

Controller 135 may further include a compensation terminal C 138 for coupling the external compensation components to the output terminal of an error-amplifier, the inverting input terminal of which is coupled internally to the feedback terminal FB 136 (shown in FIG. 3B). The external compensation components coupled to the compensation terminal C 138 may include capacitor 139, resistor 133, and capacitor 148, which together form a proportional-integral (PI) voltage loop transfer function to compensate for the effects of phase shift to prevent instability due to possible undesirable poles of the voltage loop.

Figure 2A:
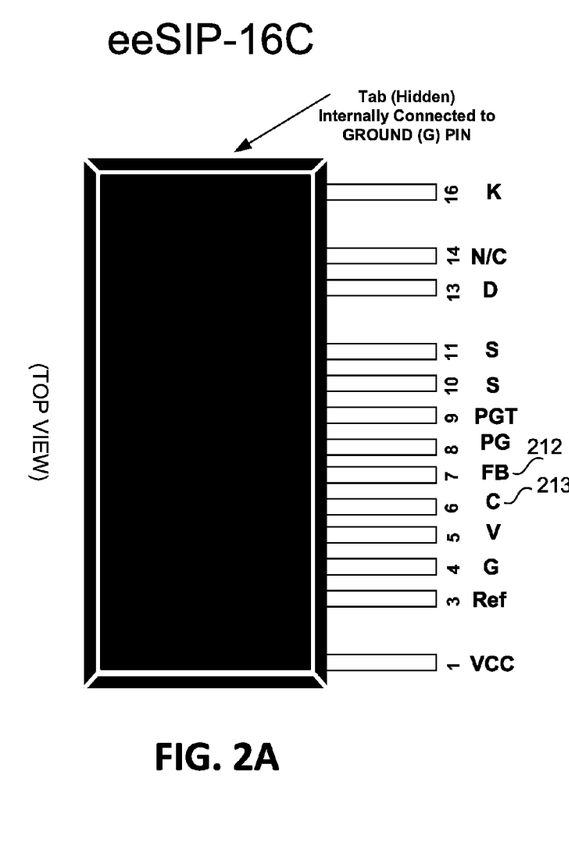
FIGS. 2A-C illustrate exemplary packaging and pin-outs of an IC controller having adjacent feedback (FB) and compensation (C) terminals that are to be protected from a short circuit.
Figure 2B:
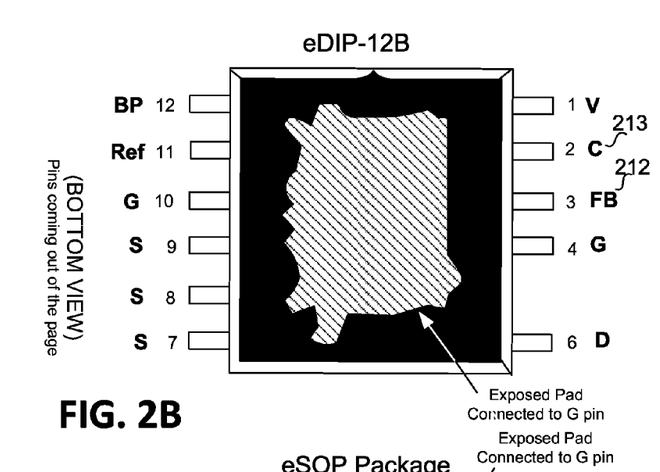
Figure 2C:
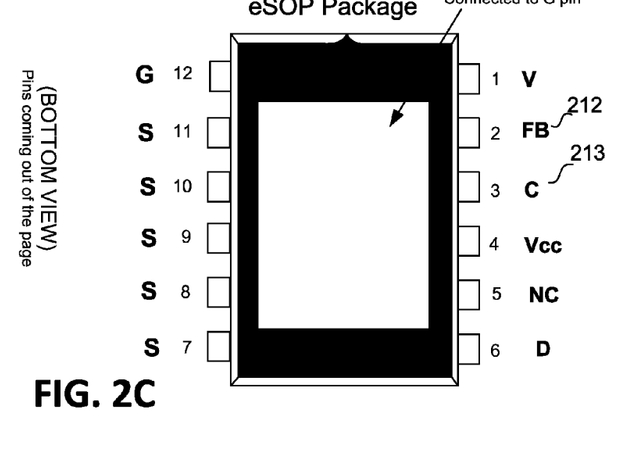

FIGS. 2A-C illustrate various example IC packages that may be used for integrating the controller and switching device (e.g., controller 135 and switching device 120 of FIG. 1) in a monolithic or hybrid semiconductor package. In one example, the boost diode (115 in FIG. 1) may also be included in the same IC package to simplify circuit design, enhance performance, and increase efficiency. It is appreciated that many other package types, not explicitly mentioned in this application, may also be used. To avoid unnecessary complexity, only the protected adjacent terminals (feedback terminal FB 212 and compensation terminal C 213) are labeled on each package.

The example packages shown in FIGS. 2A-C are designed with an exposed pad for improved heat transfer and noise immunity. It is appreciated that in other examples of packaging, exposed pad may not be employed. The multiple source terminals (S) of the switching element may act as a heat sink as well by conducting thermal energy dissipated within the switching element. Due to the small clearance spacing between terminals of most IC packages and the small spacing between terminal footprints on printed circuit boards (PCBs), it is possible that an unwanted coupling, or shorting, may accidentally be formed between the feedback FB terminal and an adjacent terminal. This may be problematic as the feedback terminal provides the data to the controller that is used for regulation and stability of the power supply operation. Errors on the feedback terminal due to shorting to another terminal may result in inaccurate feedback data being provided to the controller, further resulting in output instability or hazardous output voltages. In some examples, some terminals may be removed to provide increased spacing between terminals as a safety measure for high-voltage and electric field immunity.

FIG. 2A shows the top view of an eeSIP-16C IC package with 13 of 16 pin-outs. To simplify the boost power board design, to minimize the parasitic effects, and to enhance performance and efficiency, the boost diode (115 in FIG. 1) may be included in the IC. The pin-out terminal K 16 on the eeSIP-16C IC package of FIG. 2A is the cathode terminal of the internal boost diode to be coupled to the output of the converter, as depicted in FIG. 1. Terminals 2, 12, and 15 have been removed to provide higher clearance space between the crucial terminals that may need more spacing and/or clearance. Specifically, extra clearance space may be provided between terminal K 16 (cathode of the boost diode) and terminal D 13 (terminal N/C 14 is a no connection pin); between terminal D 13 (drain of MOSFET) and terminal S 11 (source of MOSFET); and between terminal Ref 3 (reference voltage) and terminal VCC 1 (dc supply of the controller). Terminal G 4 (ground) may be internally coupled to the source of the MOSFET (as shown in FIG. 1) and the tab coupling on the backside of the package may also be coupled to ground terminal G 4. Based on the application and the type of IC package used, the external couplings and the components coupled to each terminal may differ from the circuit diagrams of FIG. 1 and FIG. 3C.

FIG. 2B shows a bottom view of an eDIP-12B IC package with 11 of 12 pin-outs and an exposed pad on the bottom side coupled to the ground terminal G 4. In this package, terminal 5 has been removed to increase the creepage and clearance space between the high-voltage drain terminal D 6 of the MOSFET and the ground terminal G 4. The G terminal may be coupled to the ground reference of the circuit through the source terminal of the integrated power switch, which is represented by multiple "S" terminals 7, 8, and 9, offering a wide current path and providing a partial heat sink functionality to help with heat dissipation. In the illustrated example, drain terminal D 6 may be internally coupled to the drain terminal of an integrated power switch and may be externally coupled to the common point between the boost inductor and the boost output rectifier diode. Terminal V 1 may be coupled to the rectified input voltage ($V_{RECT}$ 106 in FIG. 1) through a resistor divider to provide information (e.g., peak value and zero-crossing information) to the controller. The bypass terminal BP 12 (also referred to as the Vcc terminal) may be coupled to an external dc power supply or a supply winding on the energy transfer inductor of the (boost) converter to provide power for the internal blocks of the controller. The reference terminal Ref 11 may be used to provide an internal reference voltage by inserting a decoupling capacitor between this terminal and ground. While specific configurations are provided above, it should be appreciated that other pin-outs are possible for eDIP package options based on the application requirements.

FIG. 2C shows a bottom view of an eSOP IC package with 12 pin-outs and an exposed pad on the bottom side that is coupled to the ground terminal G 12. In the illustrated package, terminal NC 5 is a no connect terminal. Terminal V 1 may be coupled to the rectified input voltage ($V_{RECT}$ 106 in FIG. 1) through a resistor divider to provide information (e.g., peak value and zero-crossing information of input ac line) to the controller. The G terminal may be coupled to the ground reference of the circuit through the source terminal of the integrated power switch, which is represented by multiple "S" terminals 7-11, offering a wide current path and providing a partial heat sink functionality to help with heat dissipation. Drain terminal D 6 may be internally coupled to the drain terminal of an integrated power switch and may be externally coupled to the common point between the boost inductor and the boost output rectifier diode. The terminal Vcc 4 (also referred to as the bypass BP terminal) may be coupled to an external dc power supply or a supply winding on the energy transfer inductor of the (boost) converter to provide power for the internal blocks of the controller. While specific configurations are provided above, it should be appreciated that other pin-outs are possible for eSOP package options based on the application requirements.

Figure 3C:
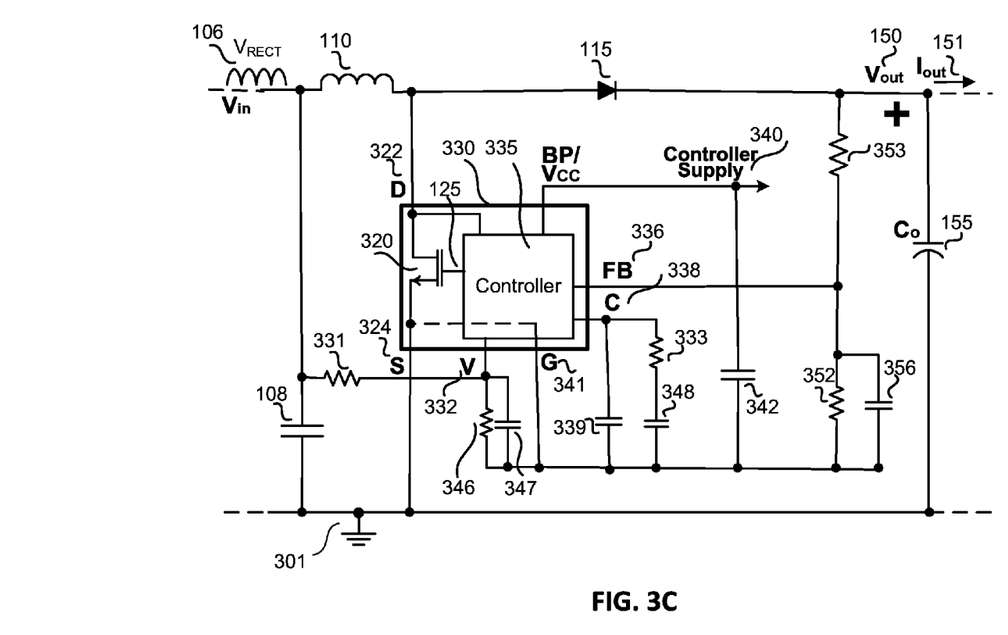
FIG. 3C illustrates exemplary external couplings of the controller of FIG. 3A in a Boost converter.

FIGS. 3A-C show the example pin-out of the eDIP IC package of FIG. 2B, an example internal coupling of feedback terminal FB 312 and compensation terminal C 313, and an example external coupling of the package in a Boost converter, respectively.

As shown in FIG. 3A, only the two adjacent protected terminals of eDIP 12-pin package 310 are labeled (compensation terminal C 313 and feedback terminal FB 312, corresponding to compensation terminal C 213 and feedback terminal FB 212 of FIG. 2B). The other terminal numbers and abbreviated names are depicted for purposes of illustrating the function and external component couplings in the circuit diagram of FIG. 1. The other terminals correspond to the similarly numbered and abbreviated terminals discussed above with respect to FIG. 2B. It should be appreciated that the arrangement of the pin-outs may vary for the different eDIP package options or for other types of packages with different numbers of pin-outs.

As shown in FIG. 3B, the controller may include a Transconductance Error-Amplifier 366 coupled to the feedback terminal FB 312 and compensation terminal C 313. Specifically, the inverting terminal of Transconductance Error-Amplifier 366 may be coupled to feedback terminal FB 312, and the non-inverting terminal of Transconductance Error-Amplifier 366 may be coupled to receive reference voltage $V_{REF}$ 365. The difference between the voltage at feedback terminal FB 312 (e.g., representative of a scaled output voltage) and the reference voltage $V_{REF}$ 365 may be amplified and transduced by Transconductance Error-Amplifier 366 as a current 367 to generate an output error signal across resistor 368 to control switching (e.g., ON and OFF time) of the power switch (e.g., switch 120 in FIG. 1 or 320 in FIG. 3C). The output of Transconductance Error-Amplifier 366 and resistor 368 may be coupled to the compensation terminal C 313 and to filter 369, which may include a resistor and capacitor, as shown in FIG. 3B. It should be appreciated that the voltage at feedback terminal FB 312 may also be used for output voltage under-voltage and over-voltage protection. Additionally, while other controller blocks are not shown in FIG. 3B, it should be appreciated by one of ordinary skill in the art that the error-amplifier signal 370 may be used in other controller blocks to provide, for example, PFC.

FIG. 3C illustrates the controller 335 of FIGS. 3A and 3B coupled within a Boost converter. The terminals of controller 335 are coupled as described above with respect to FIG. 1, with similarly numbered elements representing the same or similar components (e.g., 301, 320, 322, 324, 331, 332, 333, 335, 336, 338, 339, 340, 341, 342, 346, 347, 348, 352, 353, and 356 corresponding to 101, 120, 122, 124, 131, 132, 133, 135, 136, 138, 139, 140, 141, 142, 146, 147, 148, 152, 153, and 156, respectively).

Figure 4:
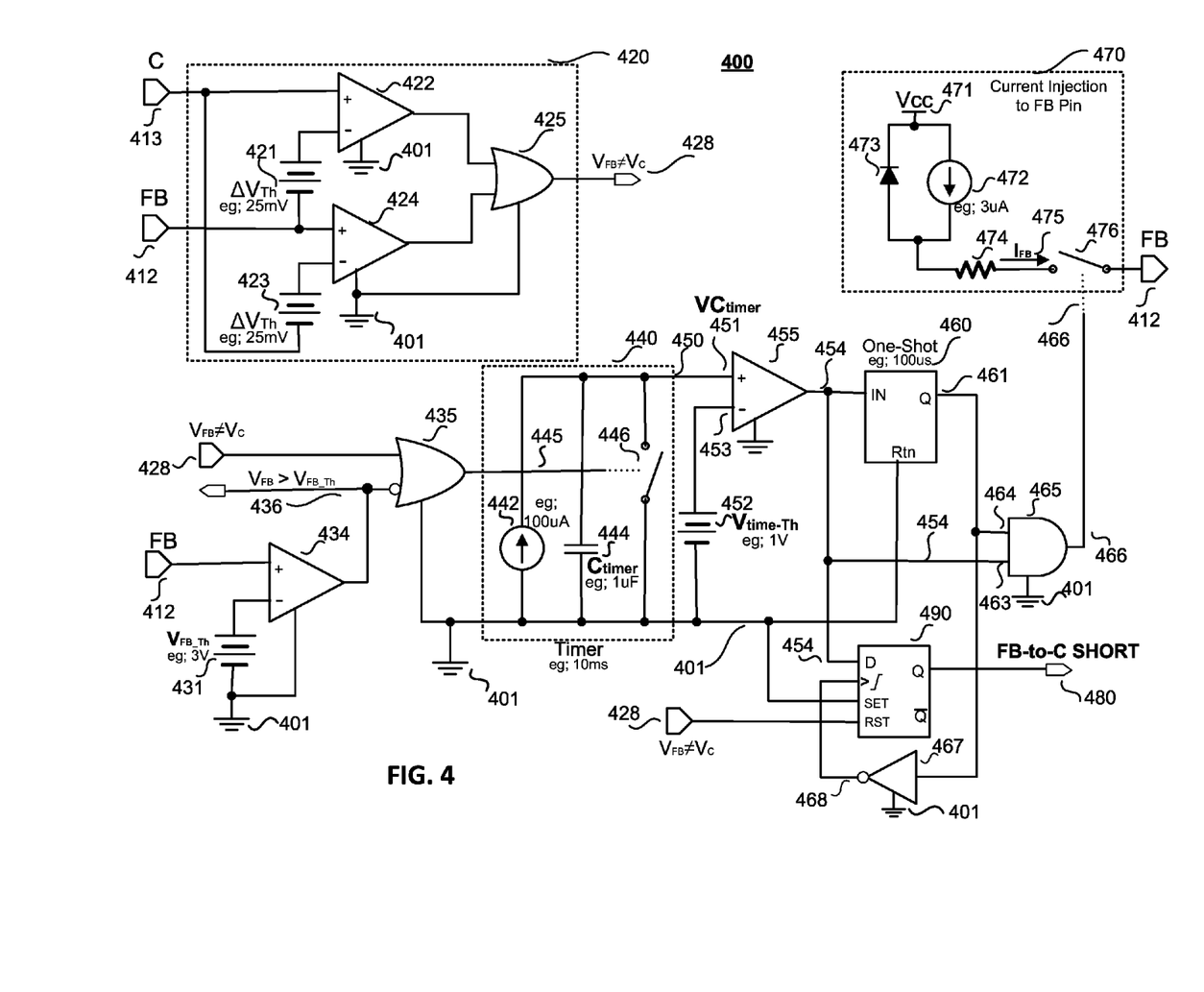
FIG. 4 illustrates a simplified block circuit diagram of an exemplary adjacent terminal fault detection circuit.

FIG. 4 illustrates a block circuit diagram 400 of an exemplary adjacent terminal fault detection circuit that may be used to detect shorts or couplings between two terminals (e.g., a feedback terminal and an adjacent compensation terminal) of a controller. In some examples, the fault detection circuitry may be at least partially included within the controller. Generally, the fault detection circuitry may include comparison circuitry 420 for identifying when the difference between the voltages at feedback and compensation terminals FB 412 and C 413 falls below a threshold value, timer circuitry (circuitry outside of blocks 420 and 470) for measuring a first duration of time that the voltage difference between the adjacent terminals falls below the threshold value and a second duration of time that current injection circuitry 470 injects current into the feedback terminal FB 412, and current injection circuitry 470 for injecting a small amount of current into the feedback terminal FB 412. While described herein as injecting current into the feedback terminal FB 412, current may instead be injected into the compensation terminal C 413. However, in general it is beneficial to inject the current into the terminal associated with the higher impedance and/or higher bandwidth in order to assess the fault more quickly with a smaller amount of injected current.

Block 420 (e.g., comparison circuitry) may be configured to detect and verify that the voltages at the two adjacent protected terminals FB 412 and C 413 are within the minimum difference threshold ($\Delta V_{Th}$) values of 421 and 423. Block 420 may include comparator 422 having its non-inverting terminal coupled to compensation terminal C 413 and its inverting terminal coupled to the minimum difference threshold 421. Block 420 may further include a second comparator 424 having its non-inverting terminal coupled to feedback terminal FB 412 and its inverting terminal coupled to the minimum difference threshold 423. Comparators 422 and 424 may be referenced to ground 401 and their outputs may be coupled to the input terminals of OR gate 425, which may also be referenced to ground 401. In this configuration, during normal operation, the output of OR gate 425 (signal $V_{FB} \neq V_C$ 428) may be high when the voltage on compensation terminal C 413 is greater than the voltage on feedback terminal FB 412 by more than threshold 421 (resulting in the output of comparator 422 being high) or when the voltage on feedback terminal FB 412 is greater than the voltage on compensation terminal C 413 by more than threshold 423 (resulting in the output of comparator 424 being high). In other words, signal $V_{FB} \neq V_C$ 428 may be high if the difference between the voltages at compensation terminal C 413 and feedback terminal FB 412 is greater than the minimum difference threshold(s) defined by minimum difference thresholds 421 and 423 (representative of no shorting between the terminals). Signal $V_{FB} \neq V_C$ 428 may be at a logic low level if neither of these conditions exists (e.g., the difference between voltages at compensation terminal C 413 and feedback terminal FB 412 is less than the minimum difference threshold(s) defined by minimum difference thresholds 421 and 423, which may be representative of a shorting between the terminals). In some examples, minimum difference thresholds 421 and 423 may have the same values while, in other examples, minimum difference thresholds 421 and 423 may have different values.

The timer circuitry (circuitry outside of blocks 420 and 470), may be coupled to receive signal $V_{FB} \neq V_C$ 428 from the comparison circuitry 420. The timer circuitry may include a second OR gate 435 coupled to receive signal $V_{FB} \neq V_C$ 428 at one of its input terminals. OR gate 435 may be coupled to output signal 445 to block 440, which may be a capacitor timer formed from constant current source 442, charging capacitor 444, and reset switch 446. During normal operation without any adjacent terminal shorts, signal $V_{FB} \neq V_C$ 428 may be at a logic high (no short), causing signal 445 output by OR gate 435 to also be at a logic high. Signal 445 being at a logic high may then cause switch 446 to close, thereby discharging capacitor 444 and pulling down the voltage of output signal 450 of block 440. In one example, constant current source 442 may have a value of 100 uA and capacitor 444 may have a capacitance of 1 uF. In this example, it would take approximately 10 ms to charge capacitor 444 to 1V while switch 446 is open (dt=C*dV/I=1 uF*1V/100 uA=10 ms). This time corresponds to the first duration of time that the voltage difference between the adjacent terminals falls below the threshold values 421 and 423, discussed above.

During normal operation without any adjacent terminal shorts, switch 446 remains closed, causing the pulled-down signal 451 at the non-inverting input of comparator 455 to be less than the threshold voltage $V_{time\_Th}$ 452 (e.g., 1V) at the inverting input of comparator 455. This causes output signal 454 of comparator 455 to be at a logic low level. This low output signal 454 may be received at the input terminal of the one-shot (e.g., a monostable multi-vibrator) timer 460, resulting in output signal 461 being at a logic low level. This low output signal 461 may be received at input terminal 464 of the AND gate 465, causing output signal 466 to also be at a low level. The low signal 466 causes switch 476 in block 470 (e.g., current injection circuitry) to be open (OFF) with no current injection from supply $V_{CC}$ 471 through the current source 472 and resistor 474 to the feedback terminal FB 412. While switch 476 is open, the diode 473 provides a bypass path for the current source 472.

In the event of an adjacent terminal short fault (e.g., that either the voltage on compensation terminal C 413 is not greater than the voltage on feedback terminal FB 412 by more than the minimum difference threshold ($\Delta V_{Th}$) 421 or that the voltage on feedback terminal FB 412 is not greater than the voltage on compensation terminal C 413 by more than the minimum difference threshold ($\Delta V_{Th}$) 423), the outputs of comparators 422 and 424 remain low, resulting in a low signal $V_{FB} \neq V_C$ 428 at the output of OR gate 425. It should be appreciated that in a simple implementation when both minimum difference thresholds ($\Delta V_{Th}$) 421 and 423 are equal, signal $V_{FB} \neq V_C$ 428 may go low when the absolute value of the voltage difference between the two adjacent terminals falls below the minimum difference threshold ($|V_{FB}-V_C|<\Delta V_{Th}$).

When signal 436 is high (discussed in greater detail below) and when signal $V_{FB} \neq V_C$ 428 is low due to an adjacent terminal short fault, the output signal 445 of the second OR gate 435 may be low, causing switch 446 to be open (OFF). As a result, the timer capacitor $C_{timer}$ 444 may begin charging by the constant current source 442. This charging initiates a time count process until the voltage across timer capacitor $C_{timer}$ 444 reaches and exceeds the threshold voltage reference value $V_{time\_Th}$ 452 coupled to the inverting input 453 of comparator 455. In one example, the threshold voltage reference value $V_{time\_Th}$ 452 may have a value of 1V, the constant current source 442 may have a value of 100 uA, and capacitor 444 may have a capacitance of 1 uF. In this example, the timer implemented using block 440 may count a time duration of 10 ms from the time that the adjacent terminal short fault between feedback and compensation terminals FB 412 and C 413 is detected, causing signal $V_{FB} \neq V_C$ 428 to fall to a logic low, until the voltage across capacitor 444 and at input 451 of comparator 455 reaches threshold voltage reference value $V_{time\_Th}$ 452.

In response to the voltage across capacitor 444 increasing to a value greater than threshold voltage reference value $V_{time\_Th}$ 452, signal 454 at the output of comparator 455 and at the input of One-shot (e.g., a monostable multivibrator) timer 460 may go high, thereby activating output 461 of One-shot timer 460 for a duration of time (e.g., 100 us) deemed adequate to raise $V_{FB}$ well above $V_C$ in the event no adjacent terminal short exists. The length of the pulse generated by One-shot timer 460 corresponds to the second duration of time that current injection circuitry 470 injects current into the feedback terminal FB 412, discussed above. If signal 454 remains high during the 100 us duration of activating output 461 (the difference between adjacent terminals is still less than the minimum difference threshold, indicating a fault condition still exists), then both inputs to the AND gate 465 may be high, causing output 466 to also be high. A high signal 466 may cause switch 476 to close (ON), allowing the injection current $I_{FB}$ 475 to be injected to the feedback terminal FB 412. After the activation duration of output 461, signal 461 experiences a falling edge and signal 468 experiences a rising edge through the inverter 467. As a result, fault signal FB-to-C SHORT 480 output by latch 490 (e.g., output circuitry) may transition to a logic high as a result of logic '1' data D 454 input to latch 490 being clocked by the rising edge of inverter output 468, indicating that a short has been detected between the feedback and compensation terminals FB 412 and C 413, thereby disabling the controller and stopping the switching of the switching device (120 in FIG. 1 and 320 in FIG. 3C). If, however, at the end of the 100 us duration after activating output signal 461, signal 454 has dropped to a logic low (the difference between adjacent terminals is not less than the minimum difference threshold, indicating that the fault condition has been cleared and no longer exists), then the fault signal FB-to-C SHORT 480 remains low as a result of logic '0' data D 454 input to latch 490 being clocked by the rising edge of inverter output 468, allowing the controller to resume normal operation. The set terminal of latch 490 may be coupled to ground 401 (e.g., disabled) and the reset terminal may be coupled to receive signal $V_{FB} \neq V_C$ 428 to allow the fault signal 480 to be reset in the event that the fault is subsequently cleared.

As mentioned above, the second OR gate 435 may further receive a second input signal 436 at its inverting terminal. Signal 436 may be output by comparator 434, which may be coupled to receive the feedback signal from feedback terminal FB 412 (after any required buffering and filtering) at its non-inverting terminal and may be coupled to receive at its inverting terminal a feedback threshold $V_{FB\_Th}$ 431 that, in one example, may be 3V. In operation, when the feedback signal 412 is above the feedback threshold $V_{FB\_Th}$ 431 (nearing or at its regulation voltage), signal 436 output by comparator 434 may be high. In normal steady-state operation, the feedback signal will increase to a value greater than the feedback threshold $V_{FB\_Th}$ 431. It is within this voltage range that the converter is most susceptible to problems caused by an adjacent terminal short, hence the circuit is enabled within this operating voltage range. Since a high signal 436 does not dominate the logic output of OR gate 435, OR gate 435 shall be dominated by its non-inverted input signal $V_{FB} \neq V_C$ 428. However, if the feedback signal from feedback terminal FB 412 is below the feedback threshold $V_{FB\_Th}$ 431 (e.g., 3V), the output signal 436 of comparator 434 becomes low and dominates the output signal 445 of OR gate 435 and forces it to be high. As a result, switch 446 may be switched to the closed position (ON) and the timer implemented with block 440 may not be activated even if a short between feedback and compensation terminals FB 412 and C 413 is detected (as indicated by signal $V_{FB} \neq V_C$ 428).

While a specific configuration is shown in FIG. 4, it should be appreciated that the functionality of the fault detection circuit, described above, may be implemented in various ways. For example, rather than inverting the output of comparator 434, the inputs to comparator 434 may be reversed.

Figure 5:
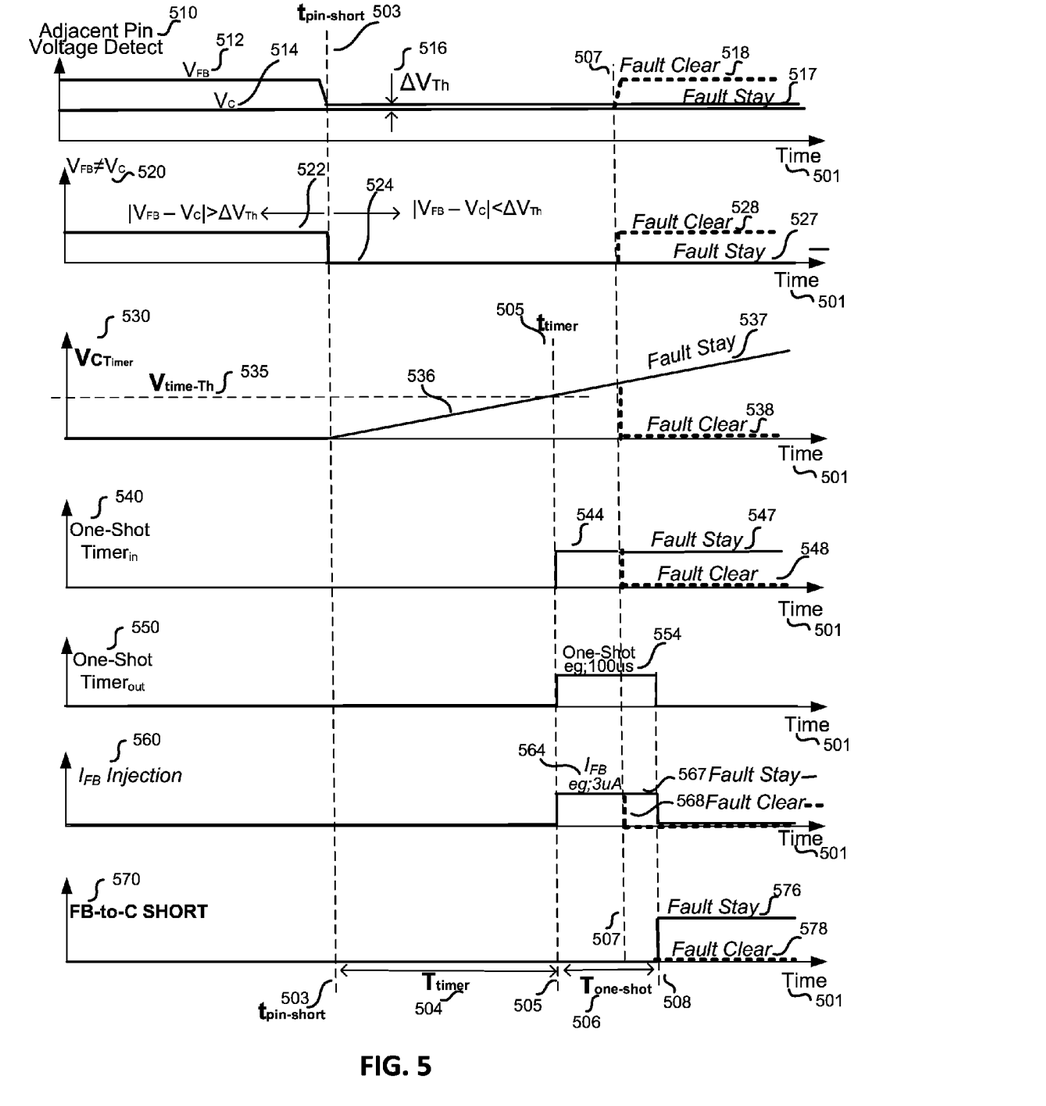
FIG. 5 illustrates example signal waveforms for the block circuit diagram of FIG. 4.

FIG. 5 illustrates example signal waveforms for the block circuit diagram 400 of FIG. 4. As shown in FIG. 5, the horizontal axis for each waveform represents time 501. The vertical axis 510 of the first graph represents voltage and the first graph includes the detected feedback voltage $V_{FB}$ 512 at feedback terminal FB 412 and the detected compensation voltage $V_C$ 514 at compensation terminal C 413. As shown, before time $t_{pin-short}$ 503, there is no short (e.g., no accidental coupling) between the adjacent terminals as the difference between the two detected voltages is greater than the minimum difference threshold $\Delta V_{Th}$ 516. However, after time $t_{pin-short}$ 503, a short between the adjacent terminals is detected as the difference between the two detected voltages is equal to or less than the minimum difference threshold $\Delta V_{Th}$ 516.

If, in one example, the short circuit between the terminals is not permanent and is cleared at time 507, then $V_{FB}$ signal 512 level goes back high, Fault Clear 518, otherwise $V_{FB}$ stays at nearby level of $V_C$, Fault Stay 517 ($V_{FB}-V_C \leq \Delta V_{Th}$).

The vertical axis of the second graph represents a comparison of voltages $V_{FB}$ 512 and $V_C$ 514 with reference to minimum difference threshold $\Delta V_{Th}$ 516. As shown, before time $t_{pin-short}$ 503, there is no short detected between the adjacent terminals as the difference between the two detected voltages is greater than the minimum difference threshold $\Delta V_{Th}$ 516 ($|V_{FB}-V_C|>\Delta V_{Th}$). During this time, signal $V_{FB} \neq V_C$ 520 (e.g., signal 428 in FIG. 4) remains at a high voltage level 522. However, after time $t_{pin-short}$ 503, a potential short between the adjacent terminals is detected as the difference between the two detected voltages is equal to or less than the minimum difference threshold $\Delta V_{Th}$ 516 ($V_{FB} \approx V_C$; $|V_{FB}-V_C|<\Delta V_{Th}$). During this time, signal $V_{FB} \neq V_C$ 520 (e.g., signal 428 in FIG. 4) remains at a low voltage level 524.

In one example, if the short circuit between the terminals has cleared at time 507, signal $V_{FB} \neq V_C$ goes back high, shown by signal Fault Clear 528, otherwise the signal $V_{FB} \neq V_C$ remains low, shown by Fault Stay 527.

The vertical axis of the third graph represents the voltage $V_{CTimer}$ 530 across timer capacitor (e.g., capacitor 444 in FIG. 4). During the time when there is no short between the adjacent terminals ($|V_{FB}-V_C|>\Delta V_{Th}$ and signal $V_{FB} \neq V_C$ 520 is at a high voltage level 522), the output signal (e.g., signal 445) of OR gate 435 in FIG. 4 may be at a high level, thereby keeping the discharge switch (e.g., switch 446 in FIG. 4) in the closed position (ON state) and causing the voltage $V_{CTimer}$ 530 (e.g., signal 450 in FIG. 4) across the timer capacitor (e.g., capacitor 444 in FIG. 4) at zero. However, after a short-circuit event between the adjacent terminals has occurred at time $t_{pin-short}$ 503 ($V_{FB} \approx V_C$; $|V_{FB}-V_C|<\Delta V_{Th}$), the discharge switch (e.g., switch 446 in FIG. 4) switches to an open position (OFF state) and the voltage $V_{CTimer}$ 530 (e.g., signal 450 in FIG. 4) across the timer capacitor (e.g., capacitor 444 in FIG. 4) increases substantially linearly. After a length of time as defined by threshold voltage $V_{time\_Th}$ (e.g., threshold voltage $V_{time\_Th}$ 452), the timer capacitor $C_{Timer}$ (e.g., capacitor $C_{Timer}$ 444 in FIG. 4), and the value of the constant current source (e.g., current source 442), the voltage $V_{CTimer}$ 530 reaches the timer voltage threshold $V_{time\_Th}$ 535 (e.g., voltage threshold $V_{time\_Th}$ 452 in FIG. 4). In one example, threshold voltage $V_{time\_Th}$ may be 1V, timer capacitor $C_{timer}$ may have a capacitance of 1 uF, and the value of the constant current source may be 100 uA. In this example, the threshold voltage $V_{time\_Th}$ may reach the timer voltage threshold $V_{time\_Th}$ 535 in approximately 10 ms. After this time, the one-shot timer (460 in FIG. 4) may be activated by signal 540 "One-Shot Timer$_{in}$" at input of the one-shot timer (e.g., signal 454 in FIG. 4), as shown by a pulse 544 that goes high at time $t_{timer}$ 505 when the voltage $V_{CTimer}$ 530 reaches the timer voltage threshold $V_{time\_Th}$ 535. In one example, when the short circuit between the terminals has cleared at time 507, the linear increase of $V_{CTimer}$ signal 536 stops and the voltage drops to zero due to the discharge switch (e.g., switch 446 in FIG. 4) closing (ON state) and causing the voltage $V_{CTimer}$ 530 (e.g., signal 450 in FIG. 4) across the timer capacitor (e.g., capacitor 444 in FIG. 4) as well as the signal 544 at the input of the One-Shot Timer to fall to zero, as shown by signals Fault Clear 538 and 548. In an alternate example, the short circuit between terminals has not cleared at time 507, allowing the linear increase of $V_{CTimer}$ to continue, as shown by Fault Stay 537. Signal 544 at the input of the One-Shot Timer remains high, as shown by signals Fault Stay 547.

The fifth graph illustrates the 100 us pulse 554 in the output signal 550 (e.g., signal 461) of the one-shot timer. If, after expiration of the one-shot pulse, the fault has not been cleared, the persistence of the fault condition during $T_{one-shot}$ 506 (as indicated by the simultaneous high levels of the input signal 454 and output signal 461 of the one-shot latch 460) causes the FB-to-C SHORT signal 480 to be asserted. When the one-shot pulse is active, while the fault has not been cleared, indicated by one-shot input 454 being set, switch 476 (in FIG. 4) may be closed and may inject a small confirmatory current $I_{FB}$ (e.g., current $I_{FB}$ 475 of FIG. 4 having an example value of 3 uA) to the feedback terminal FB (e.g., feedback terminal 412 in FIG. 4) to confirm presence of a short-circuit between adjacent terminals. The injected current is illustrated by pulse 564 in signal 560, $I_{FB}$ injection (e.g., current $I_{FB}$ 475 in FIG. 4).

At the falling edge of one-shot pulse 554, if the fault condition is still detected (condition $V_{FB} \approx V_C$; $|V_{FB}-V_C|<\Delta V_{Th}$), then the fault alert signal FB-to-C SHORT signal 570 may go high to level 576 to activate the disabling function of the controller. If, however, the terminal short condition is cleared at time 507 while injecting confirmatory current $I_{FB}$, then the current injection pulse 564 is terminated and at the falling edge of the one-shot pulse 554, the fault alert signal FB-to-C SHORT 570 remains at a low level 578. As a result, the power switch resumes switching and normal operation may continue.

Figure 6:
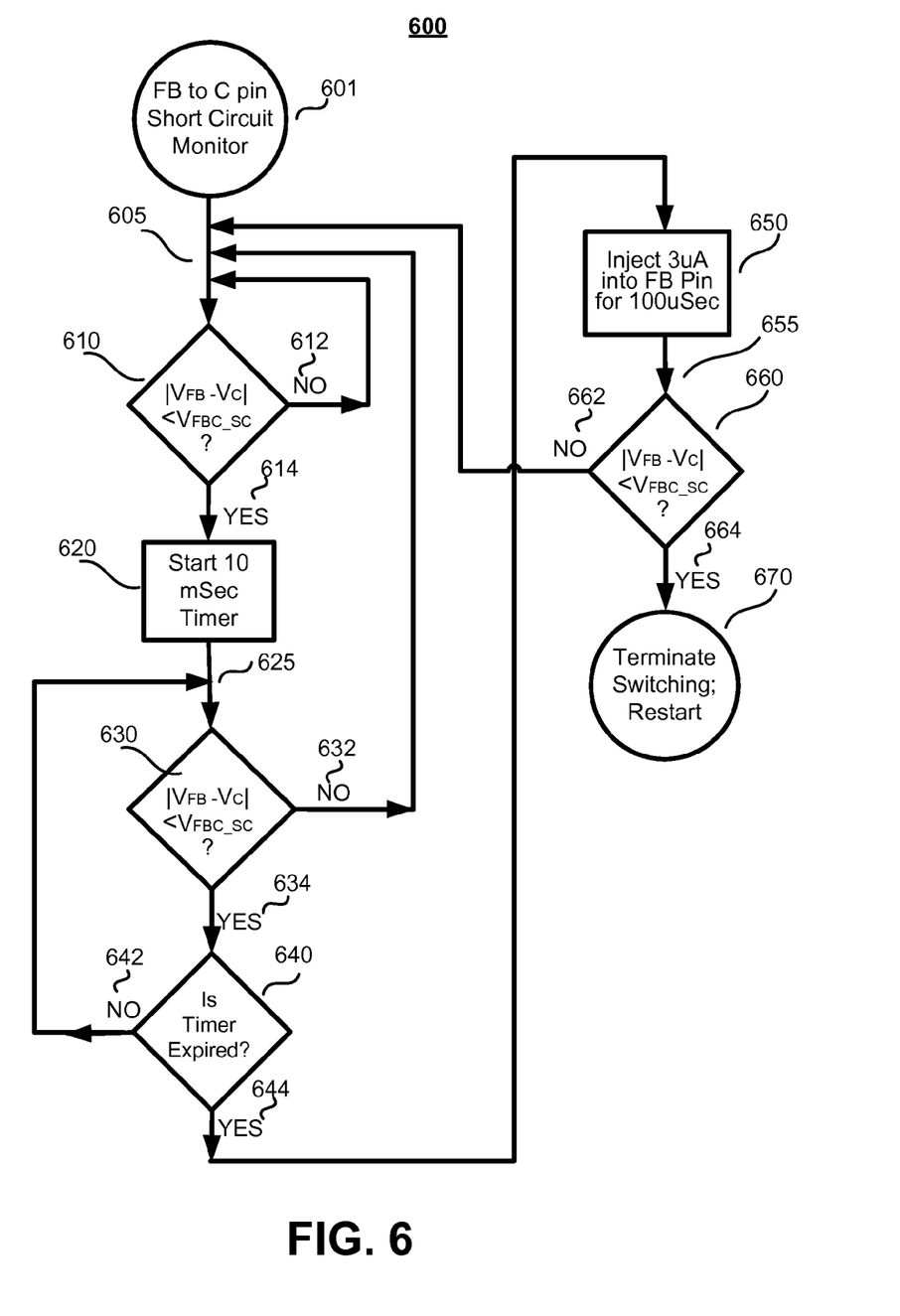
FIG. 6 illustrates a flow chart for an exemplary process for detecting an unwanted coupling between terminals of a controller.

FIG. 6 illustrates a flow chart for an exemplary process 600 for detecting an unwanted coupling between a protected terminal and another terminal of a controller. At block 601, a continuous monitoring of two terminals (e.g., the feedback and compensation terminals FB 136/212/312/336/412 and C 138/213/313/338/413) may be performed for detecting any possible short-circuit between these two adjacent terminals during normal operation of the controller. This may be performed by monitoring the voltages on both adjacent terminals. The detected voltages may be output 605 to block 610, where it may be determined if the difference between detected voltages is less than a minimum difference threshold $-\pm \Delta V_{Th}$. In one example, $\Delta V_{Th}$=25 mV and a short may be detected when the difference between the voltages at the adjacent terminals is less than 25 mV. In some examples, the determination at block 610 may be performed using circuitry similar or identical to block 420 of FIG. 4.

If it is determined at block 610 that the absolute value of difference between the two adjacent terminal voltages ($|V_{FB}-V_C|$) is not less than the minimum difference threshold $\Delta V_{Th}$ (output NO, 612), the process may return to block 605 (e.g., normal operation). If, however, it is determined at block 610 that the absolute value of the difference between the two adjacent terminal voltages ($\Delta V_{FB}-V_C|$) is less than the minimum difference threshold $\Delta V_{Th}$ (output YES, 614), the process may proceed to block 620. In some examples, the result of the determination may be represented by signal $V_{FB} \neq V_C$ 428, where a high value may represent output NO, 612, and a low value may represent output YES, 614.

At block 620, a timer may be activated to begin counting a first period of time (e.g., 10 ms). In some examples, the timer may be implemented using a circuit similar or identical to block 440 (and associated circuitry) described above with respect to FIG. 4. During the elapsed timer period (timer monitoring point 625), it may be determined if the difference between the voltages of the adjacent terminals is less than a minimum difference threshold $\Delta V_{Th}$ similar to that performed at block 610. If it is determined at block 630 that the absolute value of difference between the two adjacent terminal voltages ($|V_{FB}-V_C|$) is not less than the minimum difference threshold $\Delta V_{Th}$ (output NO, 632), the process may return to input 605 of block 610. If, however, it is determined at block 630 that the absolute value of difference between the two adjacent terminal voltages ($|V_{FB}-V_C|$) is less than the minimum difference threshold $\Delta V_{Th}$ (output YES, 634), the process may proceed to block 640.

At block 640, it may be determined if the timer initiated at block 620 has expired. If the first time period has not expired (output NO, 642), the process may return to 625 input to block 630. If, however, it is determined that the timer has expired (output YES, 644), the process may proceed to block 650.

At block 650, a small amount of current (e.g., 3 uA) may be injected through a constant current source into the feedback terminal FB for a second duration of time (e.g., 100 us). In some examples, a circuit similar or identical to block 470 of FIG. 4 (and associated circuitry) may be used to inject the current into the feedback terminal FB. The process may proceed to block 660 where it may be determined if the difference between the voltages of the adjacent terminals is less than a minimum difference threshold $\Delta V_{Th}$ similar to that performed at blocks 610 and 630. If it is determined at block 660 that the absolute value of difference between the two adjacent terminal voltages ($|V_{FB}-V_C|$) is not less than the minimum difference threshold $\Delta V_{Th}$ (output NO, 662), it may be determined that a temporary/transient error or false suspicion of an error has occurred and has been cleared and the process may return to the input 605 of block 610. If, however, it is determined at block 660 that the absolute value of difference between the two adjacent terminal voltages ($|V_{FB}-V_C|$) is less than the minimum difference threshold $\Delta V_{Th}$ (output YES, 664), it may be determined that an actual (persistent) short circuit between adjacent terminals has occurred and the process may proceed to block 670.

At block 670, the controller may terminate switching of the power switch and may enter into an auto restart mode to reset the controller and restart the converter switching. In one example, the controller may be configured such that after restarting, if the same fault condition is persistently detected (e.g., after a predetermined number of restart attempts), the controller may be latched off and will not restart until an input ac power and/or Vcc reset is manually applied. A counter may be used to track the number of restart attempts.

While the blocks of process 600 are shown in a particular order, it should be appreciated that two or more of the blocks may be performed at the same time. For example, the comparison between voltages at block 630 may be performed by a circuit similar or identical to block 420 of FIG. 4 at the same time as a latch similar or identical to one-shot latch 460 determines if the timer implemented using circuitry similar or identical to block 440 has expired.

The above description of illustrated examples of the present invention, including what is described in the Abstract, are not intended to be exhaustive or to be a limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

The invention claimed is:

1. A controller for regulating a power converter, the controller comprising:
a first terminal;
a second terminal adjacent to the first terminal; and
fault detection circuitry coupled to the first terminal and the second terminal, wherein the fault detection circuitry is configured to:
detect when a difference between a first voltage at the first terminal and a second voltage at the second terminal is less than a threshold value for a first duration of time;
supply an injection current to the first terminal for a second duration of time in response to detecting that the difference between the first voltage and the second voltage is less than the threshold value for greater than the first duration of time; and
output a fault signal in response to the difference between the first voltage and the second voltage being less than the threshold value after the second duration of time.

2. The controller of claim 1, wherein the fault detection circuitry is further configured to:
measure the first duration of time in response to detecting that the difference between the first voltage and the second voltage is less than the threshold value; and
measure the second duration of time in response to detecting that the difference between the first voltage and the second voltage is less than the threshold value for greater than the first duration of time.

3. The controller of claim 1, wherein detecting when the difference between the first voltage at the first terminal and the second voltage at the second terminal is less than the threshold value comprises:
comparing the first voltage with the second voltage plus a first offset voltage; and
comparing the second voltage with the first voltage plus a second offset voltage.

4. The controller of claim 3, wherein the first offset voltage is equal to the second offset voltage.

5. The controller of claim 1, wherein the first terminal is a feedback terminal of the controller, and wherein the second terminal is a compensation terminal of the controller.

6. The controller of claim 1, wherein the fault signal causes the controller to enter a reset mode.

7. The controller of claim 6, wherein the controller further comprises a counter operable to count a number of consecutive failed reset attempts, and wherein the controller is operable to shut down the power converter in response to the counter reaching a threshold value.

8. The controller of claim 1, wherein the first duration of time is greater than the second duration of time.

9. A power converter comprising:
- a power switch;
- an energy transfer element coupled to the power switch to transfer energy between an input and an output of the power converter; and
- a controller operable to generate a drive signal configured to switch the power switch between an ON state and an OFF state to regulate the output of the power converter, wherein the controller comprises:
  - a first terminal;
  - a second terminal adjacent to the first terminal; and
  - fault detection circuitry coupled to the first terminal and the second terminal, wherein the fault detection circuitry is configured to:
    - detect when a difference between a first voltage at the first terminal and a second voltage at the second terminal is less than a threshold value for a first duration of time;
    - supply an injection current to the first terminal for a second duration of time in response to detecting that the difference between the first voltage and the second voltage is less than the threshold value for greater than the first duration of time; and
    - output a fault signal in response to the difference between the first voltage and the second voltage being less than the threshold value after the second duration of time.

10. The power converter of claim 9, wherein the fault detection circuitry is further configured to:
- measure the first duration of time in response to detecting that the difference between the first voltage and the second voltage is less than the threshold value; and
- measure the second duration of time in response to detecting that the difference between the first voltage and the second voltage is less than the threshold value for greater than the first duration of time.

11. The power converter of claim 9, wherein detecting when the difference between the first voltage at the first terminal and the second voltage at the second terminal is less than the threshold value comprises:

- comparing the first voltage with the second voltage plus a first offset voltage; and
- comparing the second voltage with the first voltage plus a second offset voltage.

12. The power converter of claim 11, wherein the first offset voltage is equal to the second offset voltage.

13. The power converter of claim 9, wherein the first terminal is a feedback terminal of the controller, and wherein the second terminal is a compensation terminal of the controller.

14. The power converter of claim 9, wherein the fault signal causes the controller to enter a reset mode.

15. The power converter of claim 9, wherein the controller further comprises a counter operable to count a number of consecutive failed reset attempts, and wherein the controller is operable to shut down the power converter in response to the counter reaching a threshold value.

16. The power converter of claim 9, wherein the first duration of time is greater than the second duration of time.

17. A method for detecting a coupling between terminals of a controller, the method comprising:
- monitoring a voltage difference between a first voltage at a first terminal of the controller and a second voltage at a second terminal of the controller, wherein the first terminal is adjacent to the second terminal;
- applying an injection current to the first terminal of the controller for a second duration of time in response to the voltage difference between the first voltage and the second voltage falling below a threshold value for a first duration of time; and
- determining whether the voltage difference between the first voltage and the second voltage is still below the threshold value after the second duration of time.

18. The method of claim 17, wherein the first terminal is a feedback terminal of the controller, and wherein the second terminal is a compensation terminal of the controller.

19. The method of claim 17 further comprising causing the controller to enter a reset mode in response to determining that the voltage difference between the first voltage and the second voltage is still below the threshold value after the second duration of time.

20. The method of claim 17, wherein the first duration of time is greater than the second duration of time.

* * * * *